(12) United States Patent
Caldwell et al.

(10) Patent No.: US 8,778,175 B2
(45) Date of Patent: Jul. 15, 2014

(54) WATER FILTER SYSTEM

(75) Inventors: E. Neal Caldwell, Knoxville, TN (US); John Kevin Hodges, Powell, TN (US)

(73) Assignee: E. Neal Caldwell, Knoxville, TN (US)

( * ) Notice: Subject to any disclaimer, the term of this patent is extended or adjusted under 35 U.S.C. 154(b) by 366 days.

(21) Appl. No.: 13/159,705

(22) Filed: Jun. 14, 2011

(65) Prior Publication Data

US 2011/0303623 A1 Dec. 15, 2011

Related U.S. Application Data

(60) Provisional application No. 61/354,387, filed on Jun. 14, 2010.

(51) Int. Cl.
*C02F 3/06* (2006.01)
*C02F 1/00* (2006.01)
*B01D 24/42* (2006.01)
*B01D 24/10* (2006.01)

(52) U.S. Cl.
CPC . *C02F 3/06* (2013.01); *C02F 1/003* (2013.01); *C02F 2201/002* (2013.01); *B01D 24/10* (2013.01); *B01D 24/42* (2013.01); *B01D 2101/04* (2013.01)
USPC ........... 210/151; 210/256; 210/265; 210/291; 210/307; 210/474

(58) Field of Classification Search
USPC ......... 210/150, 151, 256, 265, 266, 287, 288, 210/299, 307, 474, 617, 618, 806, 807, 291
See application file for complete search history.

(56) References Cited

U.S. PATENT DOCUMENTS

| | | | |
|---|---|---|---|
| 466,809 A * | 1/1892 | Stone | 210/244 |
| 1,748,654 A * | 2/1930 | Palmer et al. | 210/474 |
| 3,618,774 A | 11/1971 | Delphia | |
| 4,330,401 A | 5/1982 | Boze et al. | |
| 4,765,892 A | 8/1988 | Hulbert et al. | |
| 5,032,261 A | 7/1991 | Pyper | |
| 5,264,129 A | 11/1993 | Simpson et al. | |
| 5,681,471 A * | 10/1997 | Silverstein | 210/617 |
| 5,993,672 A | 11/1999 | Manz | |
| 5,997,750 A * | 12/1999 | Rozelle et al. | 210/807 |
| 6,123,858 A | 9/2000 | Manz | |
| 6,966,980 B2 | 11/2005 | Blackburn | |
| 7,258,798 B2 * | 8/2007 | LeCraw | 210/807 |
| 2006/0070947 A1 * | 4/2006 | Conrad | 210/151 |
| 2008/0308479 A1 | 12/2008 | Miyazaki | |
| 2008/0308484 A1 | 12/2008 | Deb et al. | |

FOREIGN PATENT DOCUMENTS

| | | |
|---|---|---|
| GB | 2413774 A | 9/2005 |
| GB | 2413292 A | 10/2005 |

OTHER PUBLICATIONS

International Search Report and Written Opinion ; PCT/US2011/040341, date of mailing Oct. 28, 2011 15 pages.
L Huisman, Slow Sand Filtration, World Health Organization Geneva 1974, date 1974, 8 pages.

(Continued)

*Primary Examiner* — Christopher Upton
(74) *Attorney, Agent, or Firm* — Luedeka Neely Group, PC

(57) ABSTRACT

A slow/intermittent sand filter that purifies polluted water by flowing through sand in a manner that achieves greater purity and permits simpler and more effective maintenance than existing filters.

9 Claims, 6 Drawing Sheets

(56) References Cited

OTHER PUBLICATIONS

Dr. David H. Manz, P. Eng., New Horizons for Slow Sand Filtration, published in the Proceedings of the Eleventh Canadian National Conference and Second Policy Forum on Drinking Water and the Biennial Conference of the Federal-Provincial-Territorial Committee on Drinking Water, Promoting Public Health Through Safe Drinking Water, date Apr. 3-6, 2004, Calgary, Alberta, 11 pages.
Cawst, Filtration, http://www.cawst.org/index.php?id=128 date Aug. 27, 2009 , 9 pages.
Hydraid BioSand Water Filter, Why HydrAid, http//www:hydraid.org/solution/why-hydraid date Aug. 27, 2009, 3 pages.
Byron James Buzunis, Intermittently Operated Slow Sand Filtration: A New Water Treatment Process, A Thesis Submitted to the Faculty of Graduate Studies in Partial Fulfilment of the Requirements for the Degree of Master of Engineering, Department of Civil Engineering, Calgary, Alberta date Mar. 1995, 253 pages.
J.T. Visscher, R. Paramasivam, A. Raman and H.A. Heijnen, Slow Sand Filtration for Community Water Supply, Planning, design, construction, operation and maintenance, Technical Paper No. 24, International Reference Centre for Community Water Supply and Sanitation, The Hague, The Netherlands 1987, 20 pages.

* cited by examiner

WATER FILTER SYSTEM

CROSS-REFERENCE TO RELATED APPLICATION

This application claims priority to U.S. Provisional Application Ser. No. 61/354,387 filed Jun. 14, 2010, and entitled WATER FILTER SYSTEM, incorporated by reference herein in its entirety.

FIELD

This disclosure relates to the field of water purification devices. More particularly, this disclosure relates to a slow/intermittent sand filter that purifies polluted water by flowing through sand in a manner that achieves greater purity and permits simpler and more effective maintenance than existing filters.

BACKGROUND

A major issue that persists in underdeveloped areas is both water quality and quantity. Slow and/or intermittent sand filters are a good choice for such areas in that they are generally of simple and inexpensive construction and do not require the use of electricity, chemicals or other materials that require replacement. However, conventional slow sand filters still desire improvement in that they do not adequately eliminate many bacteria and are not user friendly by illiterate and unsophisticated peoples due to their maintenance requirements The present disclosure advantageously provides improved slow and/or intermittent sand filter devices having improved construction and which offer simplified maintenance as compared to conventional slow sand filters. The filters are of low cost and easily used so that the masses in undeveloped countries may have better access to cleaner water.

SUMMARY

The above and other needs are met by a water filtration system which, in one aspect, includes a treated water container and a water treatment container located substantially within the treated water container. The water treatment container is configured to receive untreated water and to treat the untreated water to yield treated water that is passed to the treated water container for storage and/or dispensing.

The water filtration system includes a treated water container and a water treatment container located substantially within the treated water container. The water treatment container is configured to receive untreated water and to treat the untreated water to yield treated water that is passed to the treated water container for storage and/or dispensing.

The treated water container includes a container having a bottom and a sidewall extending upwardly from the bottom. The water treatment container includes an upper section configured to receive a volume of water to be treated; a first and a sand containing section within the container and below the upper section having sand that includes a bio-layer having a thickness at the uppermost portion of the sand. A sand separator is located within the sand containing section and in flow communication with the water treatment container. The sand separator is configured to separate sand in the water treatment container from treated water passing to the treated water container.

A flowpath extends from a location within the sand separator to a location outside of the sand separator defining a treated water output, the treated water output being located at a height above an upper surface of the sand in the sand containing section of the water treatment container.

In another aspect, the disclosure relates to a water treatment container configured to receive untreated water and to treat the untreated water to yield treated water. The treated water container includes a container having a bottom and a sidewall extending upwardly from the bottom. The water treatment container is configured to receive a volume of water to be treated and includes a sand containing section having a bio-layer having a thickness within the water treatment container. The water to be treated passes through the bio-layer at a flow rate of about 0.10 meters per hour or less.

In yet another aspect, the disclosure relates to a method for purifying water, which includes the steps of, providing a water treatment container having a sand containing section within the water treatment container having sand that includes a bio-layer having a thickness at the uppermost portion of the sand, and maintaining flow conditions so that the water passes through the bio-layer at a flow rate of about 0.10 meters per hour or less.

Water filtration systems according to the disclosure advantageously simplify filtration of water, achieving greater purity, and have simplified maintenance requirements and reduced maintenance frequency as compared to conventional filtration systems.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
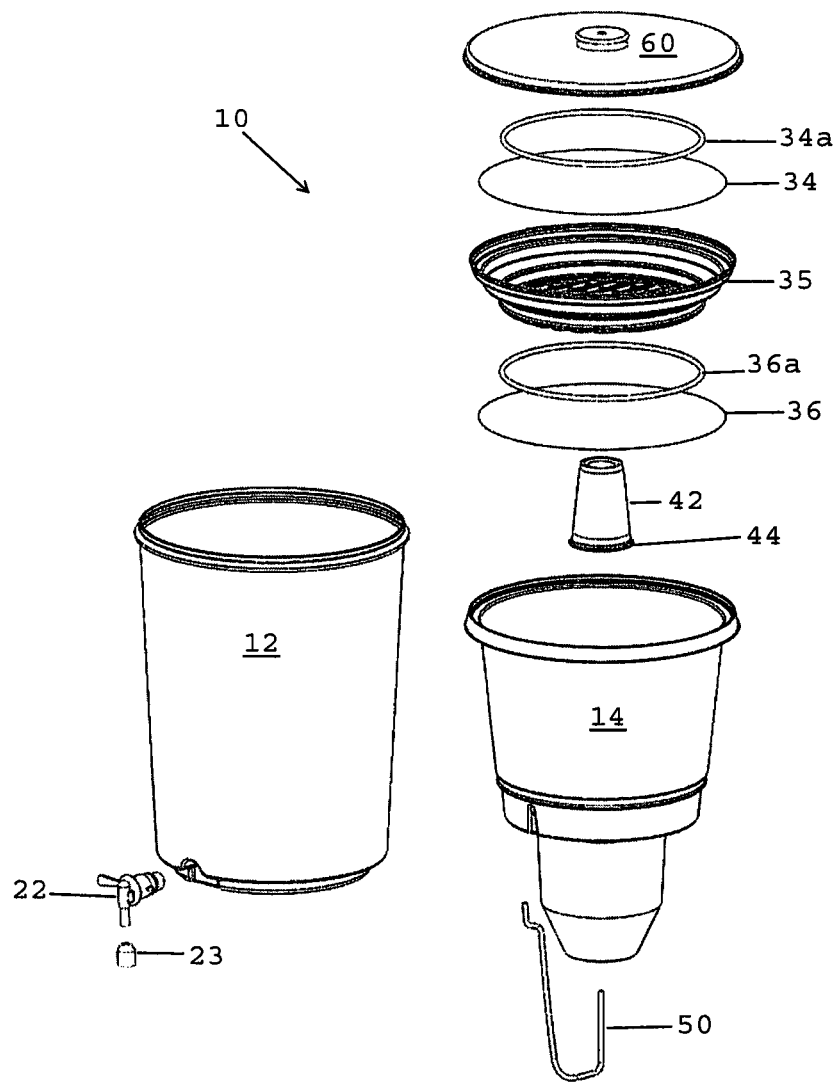
FIG. 1 is an exploded perspective view of a water treatment system according to the disclosure.

With reference to the drawings, the disclosure relates to a slow sand filter system 10 configured for removing dirt, sticks, microorganisms, and bacteria from polluted input water so that output water from the filter system 10 is significantly cleaner and purer than the input water.

One of the main ways that slow sand filters perform is by passing water thorough a bio-layer, a layer of sand that is approximately two inches thick beneath the supply water interface. This layer develops over several weeks wherein bacteria lodge in the sand and feed on the pollutants and dissolved organic matter and help to improve the quality of the treated water. It is important to let this layer develop and to limit the speed of flow through the layer so that it has time to advantageously treat the water. Over time this layer becomes clogged with solids so that water cannot flow through the layer fast enough to meet the needs for treated water. At that point, the bio-layer may be acted on by (1)

carefully stirring the top inch or so of the layer to mechanically dislodge the clogging solids and suspend the solids back into the layer of water over the sand, and (2) removing the water with the suspended solids. This "bio-layer cleaning" step is a delicate operation as it can damage the bio-layer causing it to be less effective than needed, and requiring an additional bacteria development time period before it works again as needed.

The filter system 10 of the disclosure is advantageously configured to reduce the frequency of performing, if not eliminate, the need for a bio-layer cleaning step. As will be appreciated, reducing the need for such a bio-layer cleaning step advantageously renders the filter more user friendly, more constantly functional, and accessible for use by the masses.

With reference to the drawings, the filter system 10 includes an exterior treated water container 12 and an interior water treatment container 14 located substantially within the exterior container 12. The containers 12 and 14 are sized to have substantially similar volume capacities. The treated water container 12 serves as a reservoir for receiving and holding water treated by the water treatment container 14 of the filter system 10. The water treatment container 14 receives untreated water and treats the untreated water to yield treated water that is passed to the treated water container 12 for storage and/or dispensing.

The treated water container 12 is an open topped container having a bottom 16 and a cylindrical sidewall 18 extending upwardly from the bottom 16. The container 12 is made of a fluid impermeable material such as molded plastic.

The treated water container 12 is wrapped around the water treatment container 14 or otherwise nested with the water treatment container 14 such that the treated water is part of the overall filter system 10. The wrapped or nested construction is believed to significantly reduce the possibility of recontamination of the treated water as compared to conventional filter systems which typically route the treated water to a separate collection container externally remote from the portion of the filter in which the water is treated. In this regard, it has been observed that recontamination has been found to be a significant problem in furnishing clean water to the user, and the described configuration is believed to substantially eliminate one of the most common sources of recontamination.

Treated water obtained by the treated water container 12 from the water treatment container 14 is dispensed from the treated water container 12 by gravity through a tap 22 located on a lower portion of the sidewall 18 of the treated water container 12. The tap 22 includes a valve fed by a conduit structure configured as a tube within a tube at the outlet such that if the outer tube is compromised, the inner tube remains out of reach and untouched. The treated water is dispensed via the tap 22 into the end user's container, typically a drinking cup or a cooking vessel. A removable mouthpiece 23 may be attached to the tap 22 to permit a person to place their mouth adjacent the tap 22 without contaminating the tap 22, with the mouthpiece 23 being personal to a user and removed after their use.

Matching the volume capacity of the treated water container 12 to the volume capacity of the water treatment container 14 according to the disclosure is advantageous to provide a stored volume of treated water so that the low flow speed of water through the system 10 is not detrimental to the typical needs of a home user using the system 10 to provide drinking and cooking water.

For example, the containers 12 and 14 may be configured to each have a capacity of 5 gallons. A user needing 5 gallons of treated water for the morning would then put five gallons of water to be treated into the water treatment container 14 at bedtime, and five gallons will be available by morning, since the system according to the disclosure which travels water through the bio-layer thickness at a desired average rate of about 0.03 meters per hour yields treated water at a rate of about one half (½) gallon per hour. That is, in one hour the water will flow, on average, through about 0.03 meters of the thickness of the bio-layer. To achieve this, as explained more fully below, the filter system is configured so that water passes through the bio-layer at a flow rate of about 0.10 meters per hour or less.

Conventional filters typically have no output container and are designed for quick treatment, such that if a user wants a glass of water, the needed volume is introduced and the treated water is dispensed within a minute or two, with such high production speed compromising both quality of the treated water and immediately available volumes. Thus, conventional filters typically pass water through the bio-layer at a high rate about 10 times higher and produce about 16 gallons of treated water per hour. Contrary to conventional filter structures, the filter system according to the disclosure passes water very slowly through the bio-layer, as explained more fully below.

Figure 2:
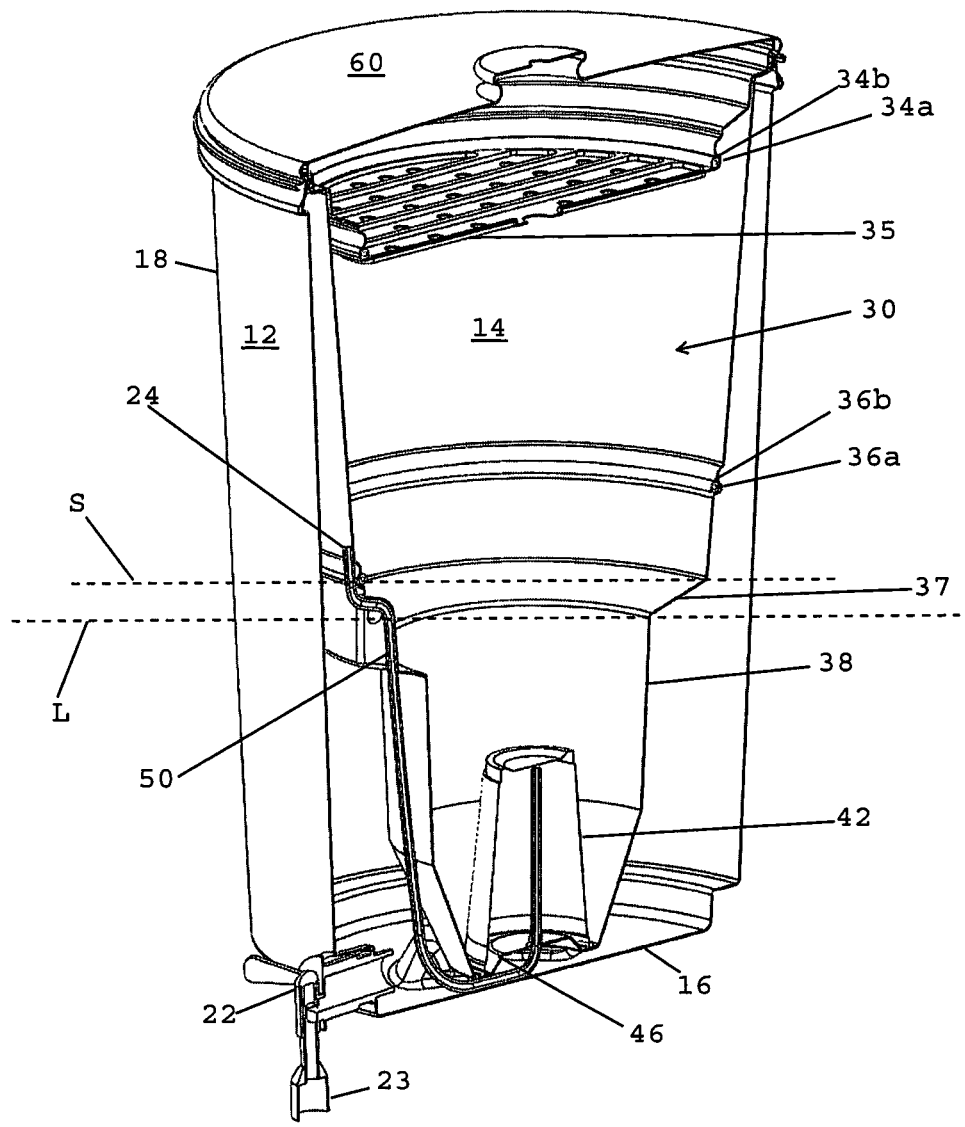
FIG. 2 is a cross-sectional perspective view of the water treatment system of FIG. 1.

The relevant volume of the treated water container 12 corresponds to the volume provided with the water treatment container 14 installed onto the treated water container 12 below a treated water output port 24 of the treatment container 14, generally corresponding to a water level L as shown in FIG. 2. Thus, if the treatment container 14 is configured to receive in batch 5 gallons of water for treatment, the treated water container 12 is sized so that the water level L corresponds to 5 gallons.

The water treatment container 14 is configured to have an upper section 30 configured to receive a volume of water to be treated. For example, if the system 10 is designed to treat 5 gallons of water as in the example set forth above, the upper section 30 is sized to hold 5 gallons of water. The upper section 30 includes a circumferential lip 32 configured to engage a corresponding upper peripheral edge of the treated water container 12. A removable upper debris screen or filter 34 is set into a filter tray 35 located within the upper section 30 to remove larger sized debris that would tend to quickly clog the sand containing portion of the filter system 10. The filter tray is a bowl-shaped plastic part having a slotted or aperture bottom. The upper debris filter 34 is held in place by a retainer 34a and the upper filter 34 may be easily removed regularly for cleaning, as by rinsing or shaking, and then replaced.

A lower debris screen or filter 36 (held in place by a retainer 36a) is preferably located in the upper section 30 and spaced below the filter tray 35, but above an intermediate section 37 located between the upper section 30 and a lower section 38. The intermediate section 37 and the lower section 38 are both filled with sand.

The retainers 34a and 36a are each provided as by sections of flexible, preferably plastic, tubing that are positioned within annular grooves 34b and 36b, respectively, on the interior sidewall of the container 14. The opposite ends of the plastic tubes butt against one another resulting in outward forces to retain the filters in place. Thus, each debris filter is placed adjacent one of the grooves and the plastic tubing is installed in the groove and the plastic tubing provides an outward force to retain the debris filter in place.

Figure 3:
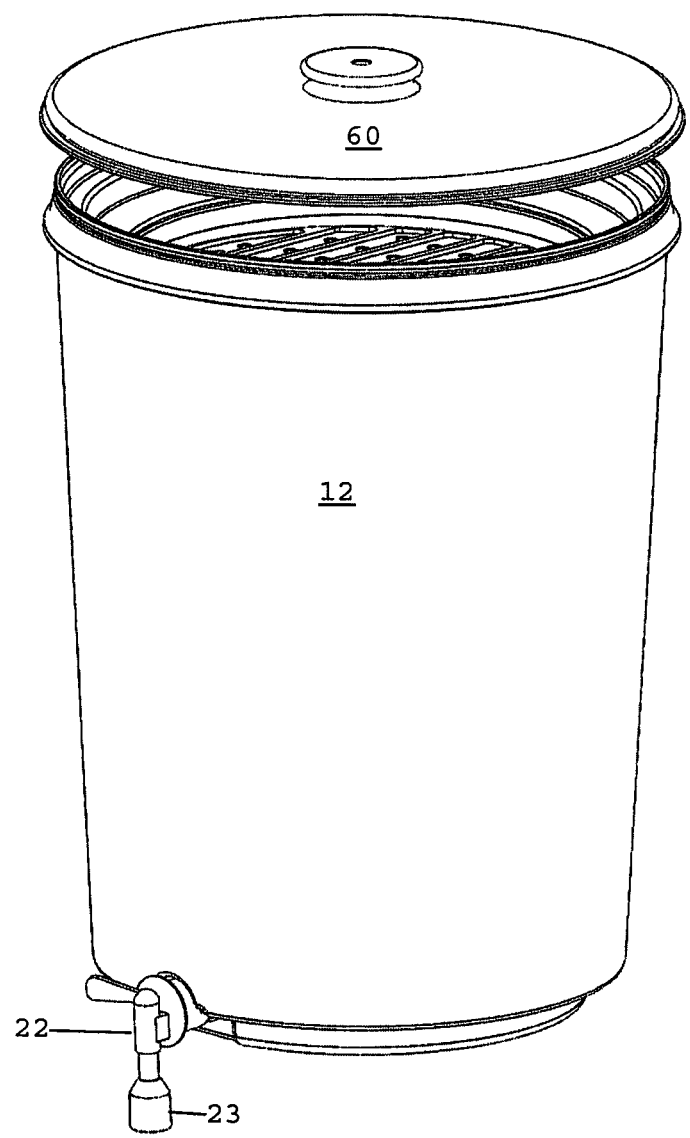
FIG. 3 is a perspective view of the water treatments system of FIG. 1, with a treated water container component thereof shown in phantom.
Figure 4:
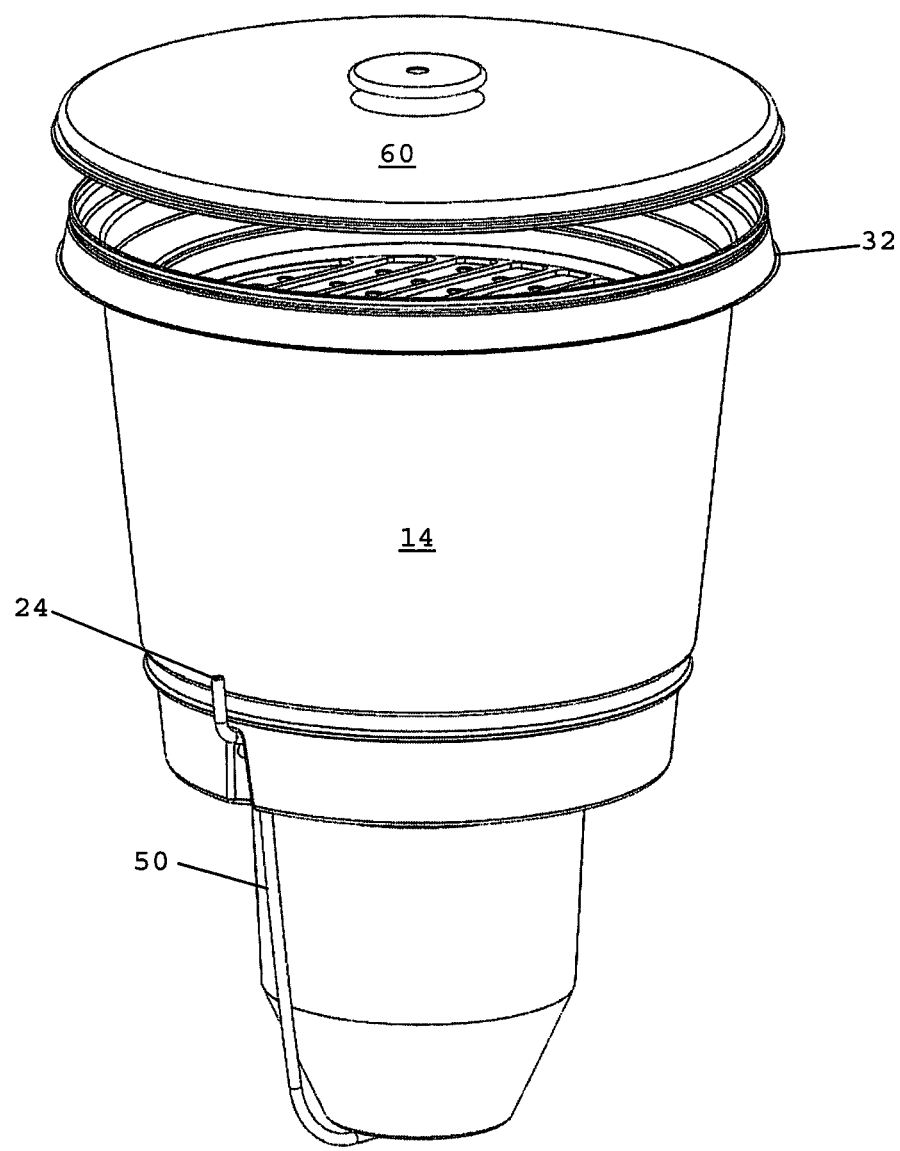
FIG. 4 is a perspective view of a water treatment container of the water treatment system of FIG. 1.

The outlet port 24 is preferably located at a height that corresponds to a height of about 2 inches above the upper surface of the sand in the intermediate section 37 (dashed line S in FIG. 3). This positioning of the outlet port 24 relative to the bio-layer (designated B in FIG. 6) provided by the uppermost portion of the sand S is desirable both to assure that with intermittent flow the water is maintained at that level so that even with evaporation that might take place in hot climates over days or weeks, the bio-layer is protected from drying out.

This lower filter 36 can easily be changed or cleaned, again to protect the bio-layer represented by the top layer of sand in the intermediate section 37 from disturbance or the need for it to be delicately cleaned later on. In this regard, the combination of the upper and lower removable filters advantageously enable improved ease of maintenance and with more effective results of the filter system 10.

Another significant aspect of the disclosure relates to the configuration of the intermediate section 37 and the lower section 38. As seen in the drawings, the intermediate section 37 has a tapered sidewall so that the intermediate section 37 decreases or tapers in cross-section as it approaches the lower section 38. The lower section 38 decreases or tapers in cross-section as it approaches a bottom 40 thereof.

For the purpose of example, for the system 10 configured to treat about 5 gallons of water, the upper section 30 has a diameter of about 13 inches and is round in cross-section. The intermediate section 37 has a diameter of about 11 inches which tapers to a diameter of about 7 inches at the bottom of the intermediate section 37. The lower section 38 has a diameter of about 7 inches, which tapers to a diameter of about 4 inches at the bottom of the lower section 38. A sand separator 42 is located on and extends upwardly from the bottom 40 of the lower section 38.

As will also be appreciated, the drawings of the described embodiment show that the containers 12 and 14 extend to substantially the same height. This is advantageous to prevent overflowing of the treated water container 12 without overflowing the water treatment container 14.

Figure 5:
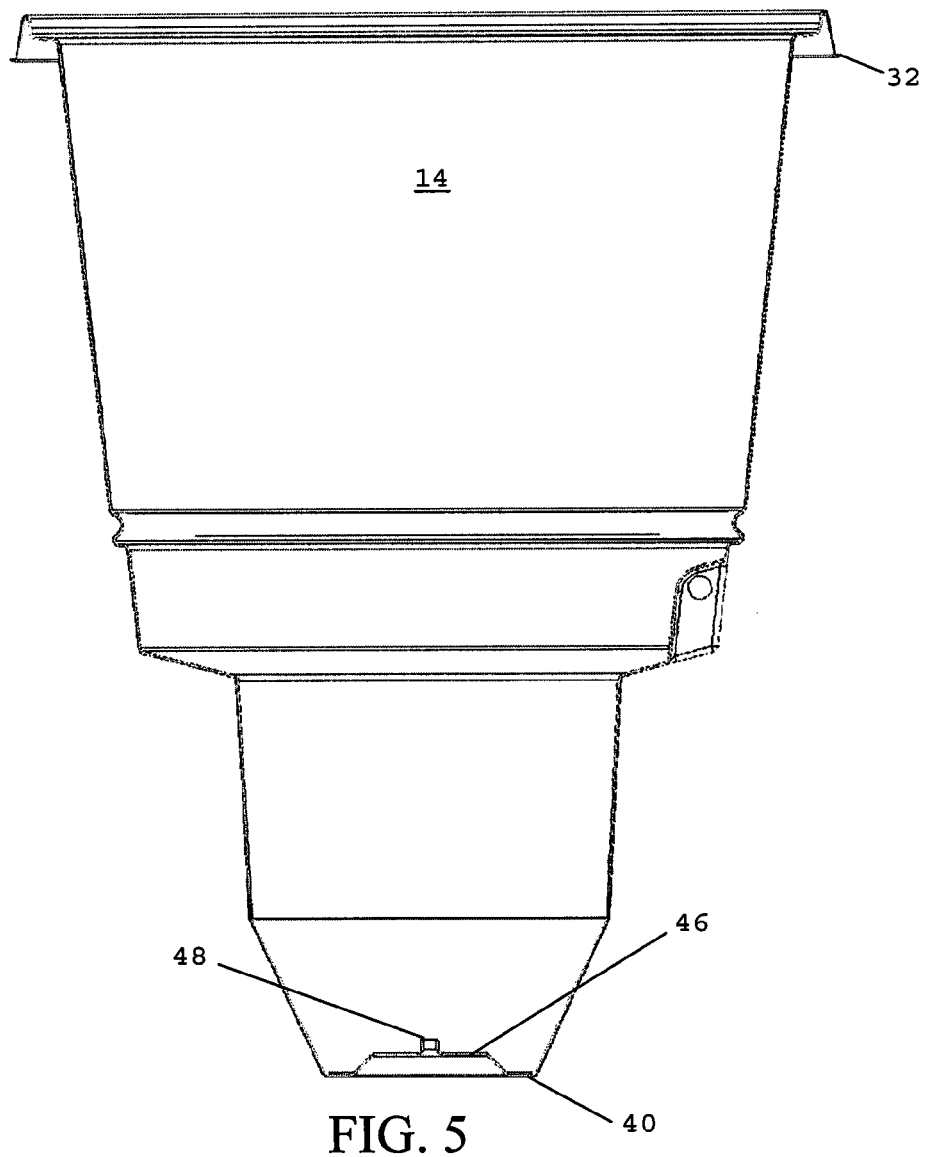
FIG. 5 is a cross-sectional view of an interior water treatment component of the system of FIG. 1.

The sand separator 42 functions to separate the sand from water leaving the water treatment container 14 and provides a vertical chamber configured as an inverted cone having an open bottom 44 located around an upward bulge 46 (FIG. 5) centrally defined on the bottom 40 of the lower section 38 of the container 14. In this regard, it has been discovered that the sand separator 42 may be provided as by a plastic drinking cup, such as a disposable plastic drinking cup of a volume of about 16 ounces. This enables reductions in costs and ease of finding replacement components.

The bottom 44 of the sand separator 42 (e.g., corresponding to the top rim of a plastic drinking cup if such is used) has a diameter of about 75% of the bottom 40 of the lower section 38, or about 3 inches for the described example system 10. A lower opening 48 is centrally located on an uppermost portion of the bulge 46. A generally J-shaped tube or conduit 50 is located within the separator 42. The tube 50 begins at a location spaced below the top of the sand separator 42 and extends downward through the opening 48 of the bulge 46 and then turns to run upwardly along the outer surface of the water treatment container 14 until terminating to provide the output port 24.

Figure 6:
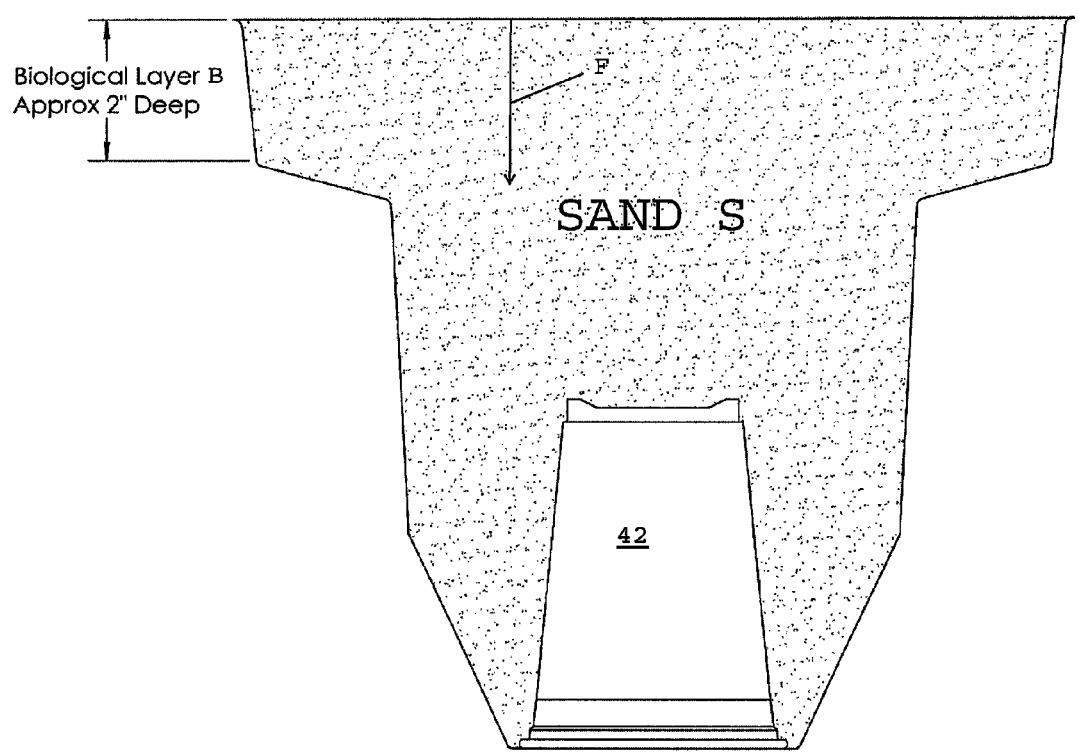
FIG. 6 is a cross-sectional view showing sand disposed in the water treatment container and having a bio-layer.

The filter system 10 is configured so as to not require a specific sand particle size or composition. However, a significant aspect of the disclosure is providing a structure that has a relatively slow flow rate F of water through the bio-layer B, which, as shown in FIG. 6 typically has a thickness of about 2 inches. The volumetric flow rate of water will depend upon the volume of the sand S, and hence the size of the treatment container. However, it has been discovered that a key aspect, regardless of the total volume of the water treatment container, is to have a flow rate through the bio-layer B of about 0.10 meters per hour or less. That is, in one hour the water will flow, at most, through about 0.10 meters of the thickness of the bio-layer B.

The maximum flow rate is usually achieved at the beginning of the process, when the water to be treated is provided to the treatment container. Over time, as the hydrostatic head decreases, the flow rate will decrease. Thus, it has been observed that if the maximum flow rate through the bio-layer B is about 0.10 meters per hour, the average flow rate through the bio-layer B will be about 0.03 meters per hour.

This low flow rate may be achieved by having, in combination with the described reduced cross-section of the lower portion of the container 14, a sand composition that provides such a flow rate, with finer sand compositions providing slower flow rates than coarse compositions. However, in the event the available sand composition does not achieve this slow a rate or slower, then a flow restrictor, such as a clamp or other valve structure may be provided on the tube 50 to decrease the flow rate.

The sand separator 42 preferably occupies space to effectively decrease the cross-sectional area to about 25% (about 25 square inches) of the greatest cross-sectional area of the sand in the system 10 (about 100 square inches), which occurs at the top of the intermediate section 37. This decrease in cross-sectional area of the sand advantageously slows down the flow rate of water (flow per square inch) in the lower section 38 where the sand remains predominantly clean and isolated from solids in the water at higher locations in the sand, especially the uppermost layer of sand that provides a bio layer, as previously described.

The described reduction in the area of the sand separator 42 that is occupied by sand, that is the rapid reduction of the cross-sectional area occupied by sand from the top to the bottom, also offers significant reduction in the volume and weight of sand required. This is particularly advantageous when the availability of suitable sand is limited in a geographic location in which the filter system is used.

It is desirable to slow the water flow through this region of the system 10 to configure the system 10 to filter slower but require less frequent maintenance, since as the upper portions of the sand become clogged with solids, such clogging will not affect the filtration rate or other operation of the filter system until such time as the upper sand becomes about 75% clogged, which is severely clogged. Thus, the filter system 10 advantageously may be operated for long periods of time without maintenance to clean the upper portion of the sand. In this regard, the sand separator 42 should decrease the cross-sectional area of the sand as described by at least about 50 percent, but most preferably from about 70 percent to about 80 percent.

The water treatment container 14 further includes a lid 60 to help keep dust and other contaminants out of the system 10 and the treated water in the treated water container 12. As will be appreciated, the water filtration system 10 advantageously simplifies filtration of water by simplifying the maintenance requirements. In addition, the construction of the filter system that enables operation despite having substantial clogging of the sand reduces the maintenance frequency as compared to conventional filtration systems. Another significant advantage is that by configuring the system for producing output water very slowly in the background on a continuing basis, the slow flow yields a far better quality of output, up to ten times more pure than conventional slow/intermittent but faster-flowing filters.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A water filtration system, comprising:
a treated water container and a water treatment container located substantially within the treated water container, the water treatment container being configured to receive untreated water and to treat the untreated water to yield treated water that is passed to the treated water container for storage and/or dispensing;
the treated water container comprising a container having a bottom and a sidewall extending upwardly from the bottom;
the water treatment container comprising an upper section configured to receive a volume of water to be treated; a first and a sand containing section within the container and below the upper section having sand that includes a bio-layer having a thickness at the uppermost portion of the sand;
a sand separator comprising an inverted solid-walled cone located within the sand containing section and in flow communication with the water treatment container, the exterior of the inverted cone of the sand separator being covered with sand and configured to separate sand in the water treatment container from treated water passing to the treated water container; and
a flowpath extending upwardly into a bottom opening of the inverted cone of the sand separator via an opening in the bottom of the water treatment container to a location outside of the sand separator defining a treated water output, the treated water output being located at a height above an upper surface of the sand in the sand containing section of the water treatment container, wherein water flows through the sand and through the bottom opening of the inverted cone of the sand separator to enter the flowpath.

2. The system of claim 1, wherein the inverted cone of the sand separator decreases the cross-sectional area of the sand containing section from an upper portion of the sand containing section to a lower section of the sand containing section.

3. The system of claim 1, wherein the water passes through the bio-layer at a flow rate of about 0.10 meters per hour or less.

4. The system of claim 1, wherein the inverted cone of the sand separator decreases the cross-sectional area of the sand from an upper portion of the sand to a lower portion of the sand by an amount of at least about 50 percent.

5. The system of claim 1, further comprising a first removable debris filter within the container and above the sand containing section.

6. The system of claim 5, further comprising a first filter retainer system to retain the first debris filter in place, the first filter retainer system comprising an annular groove defined on an interior sidewall of the water treatment container and a section of flexible tubing positioned within the annular groove and having opposite abutting ends when installed in the groove, wherein the first debris filter is placed to adjacent the groove and the flexible tubing installed in the groove and the flexible tubing provides an outward force to retain the first debris filter in place.

7. The system of claim 5, further comprising a second removable debris filter spaced from the first debris filter and above the sand containing section.

8. The system of claim 1, wherein the flowpath comprises a generally J-shaped tube located within the sand separator and having a first open end located exterior of the water treatment container to provide the treated water output.

9. The system of claim 1, wherein the treated water container, the water treatment container, the sand separator, and the flowpath are of plastic construction.

* * * * *